US010417345B1

(12) United States Patent
Carlson et al.

(10) Patent No.: US 10,417,345 B1
(45) Date of Patent: Sep. 17, 2019

(54) PROVIDING CUSTOMER SERVICE AGENTS WITH CUSTOMER-PERSONALIZED RESULT OF SPOKEN LANGUAGE INTENT

(71) Applicant: Amazon Technologies, Inc., Seattle, WA (US)

(72) Inventors: Ty Loren Carlson, Redmond, WA (US); Hsuan-Cheng Lai, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 353 days.

(21) Appl. No.: 14/579,214

(22) Filed: Dec. 22, 2014

(51) Int. Cl.
*G06F 17/28* (2006.01)
*G06F 17/27* (2006.01)
*G06F 16/638* (2019.01)
*G06F 16/9535* (2019.01)

(52) U.S. Cl.
CPC .......... *G06F 17/28* (2013.01); *G06F 16/638* (2019.01); *G06F 16/9535* (2019.01); *G06F 17/27* (2013.01)

(58) Field of Classification Search
CPC ........................................ G10L 15/08
USPC .............................. 715/716; 704/9
See application file for complete search history.

(56) References Cited

U.S. PATENT DOCUMENTS

| | | | | |
|---|---|---|---|---|
| 6,636,848 B1 * | 10/2003 | Aridor | ................ | G06F 16/951 707/728 |
| 8,346,563 B1 * | 1/2013 | Hjelm | ................ | G10L 15/1822 379/88.01 |
| 8,849,791 B1 * | 9/2014 | Hertschuh | ................ | G06Q 30/0617 707/713 |
| 8,930,180 B1 * | 1/2015 | Murray | ................ | G06F 17/27 704/1 |
| 9,392,041 B2 * | 7/2016 | Cong | ................ | H04L 65/403 |
| 9,672,204 B2 * | 6/2017 | Fang | ................ | G06F 17/2775 |
| 2006/0157560 A1 * | 7/2006 | Skor | ................ | G06Q 20/20 235/381 |
| 2007/0050191 A1 * | 3/2007 | Weider | ................ | G10L 15/22 704/275 |
| 2007/0136251 A1 * | 6/2007 | Colledge | ................ | G06F 17/3064 |
| 2008/0034081 A1 * | 2/2008 | Marshall | ................ | G08C 17/02 709/223 |
| 2008/0071742 A1 * | 3/2008 | Yang | ................ | G06F 17/30864 |
| 2009/0030698 A1 * | 1/2009 | Cerra | ................ | G10L 15/183 704/275 |
| 2009/0094224 A1 * | 4/2009 | Ricket | ................ | G06F 17/30864 |
| 2009/0228264 A1 * | 9/2009 | Williams | ................ | G10L 13/027 704/9 |
| 2009/0265163 A1 * | 10/2009 | Li | ................ | G06F 17/2785 704/10 |

(Continued)

*Primary Examiner* — Daniel C Washburn
*Assistant Examiner* — Oluwadamilola M Ogunbiyi
(74) *Attorney, Agent, or Firm* — Pierce Atwood LLP

(57) ABSTRACT

A system in which a customer service agent (CSA) is able to assist a customer with obtaining a desired response from a speech-controlled appliance while protecting customer data. The customer service agent submits queries to a natural language understanding (NLU) processor that performs entity resolution using personalized library information stored in an entity library based on the customer identity information and/or an device identifier. The CSA is shielded from the entity library itself, as well as data stored on the speech-controlled appliance. The CSA can instruct the NLU processor to deliver results to multiple endpoints, including both the customer's appliance and the CSA agent's console.

17 Claims, 15 Drawing Sheets

(56) References Cited

U.S. PATENT DOCUMENTS

| | | | |
|---|---|---|---|
| 2010/0114944 A1* | 5/2010 | Adler | G10L 13/027 707/770 |
| 2010/0124325 A1* | 5/2010 | Weng | G10L 15/22 379/265.11 |
| 2010/0250243 A1* | 9/2010 | Schalk | G10L 15/22 704/201 |
| 2011/0071819 A1* | 3/2011 | Miller | G06F 17/273 704/9 |
| 2011/0289076 A1* | 11/2011 | Boyle | G06F 17/289 707/723 |
| 2012/0173520 A1* | 7/2012 | Wu | G06F 17/30867 707/723 |
| 2012/0203708 A1* | 8/2012 | Psota | G06Q 30/02 705/347 |
| 2012/0254810 A1* | 10/2012 | Heck | G06F 3/038 715/863 |
| 2012/0303442 A1* | 11/2012 | Patwa | G06F 17/30905 705/14.41 |
| 2013/0110519 A1* | 5/2013 | Cheyer | G06F 17/3087 704/275 |
| 2013/0275164 A1* | 10/2013 | Gruber | G10L 17/22 705/5 |
| 2014/0025705 A1* | 1/2014 | Barve | G06F 17/30522 707/771 |
| 2014/0066132 A1* | 3/2014 | Burke | H04L 67/12 455/569.2 |
| 2014/0074457 A1* | 3/2014 | Masuda | G06F 17/276 704/9 |
| 2014/0123178 A1* | 5/2014 | Burkitt | H04N 21/23424 725/34 |
| 2014/0180697 A1* | 6/2014 | Torok | G06F 17/3074 704/275 |
| 2014/0288932 A1* | 9/2014 | Yeracaris | G10L 15/30 704/249 |
| 2015/0058308 A1* | 2/2015 | Zheng | G06F 17/30132 707/706 |
| 2015/0066479 A1* | 3/2015 | Pasupalak | G06F 17/27 704/9 |
| 2015/0113651 A1* | 4/2015 | Kim | H04L 51/32 726/24 |
| 2015/0134334 A1* | 5/2015 | Sachidanandam | G06F 3/167 704/251 |
| 2015/0363499 A1* | 12/2015 | Cheng | G06F 17/30867 707/722 |
| 2016/0042748 A1* | 2/2016 | Jain | G10L 25/48 704/9 |
| 2016/0098988 A1* | 4/2016 | Goussard | G10L 15/18 704/257 |
| 2016/0112240 A1* | 4/2016 | Sundaresan | H04L 67/306 726/1 |
| 2016/0140228 A1* | 5/2016 | Cohen | G06F 16/3332 707/708 |
| 2016/0372109 A1* | 12/2016 | Yeracaris | G10L 15/063 |

* cited by examiner

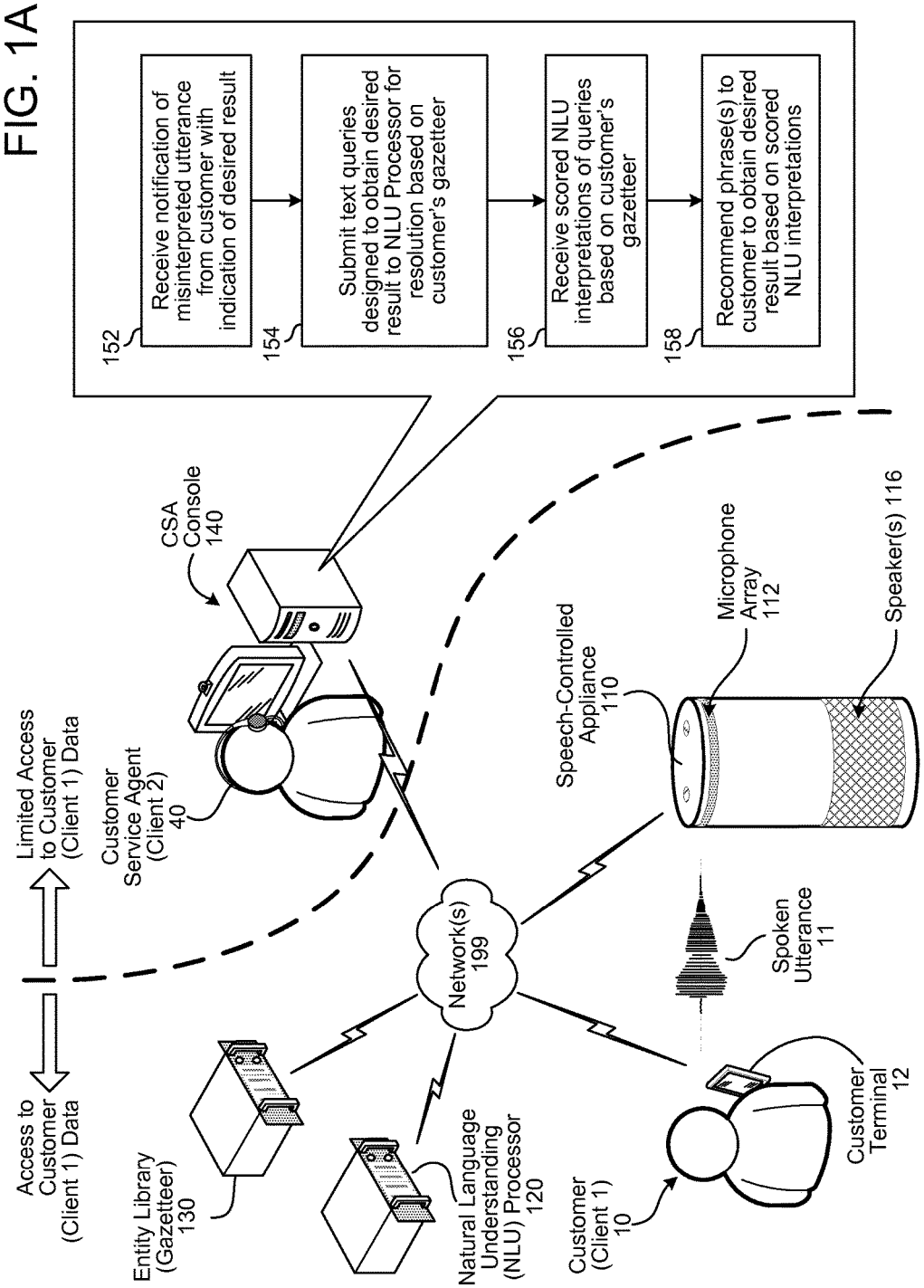

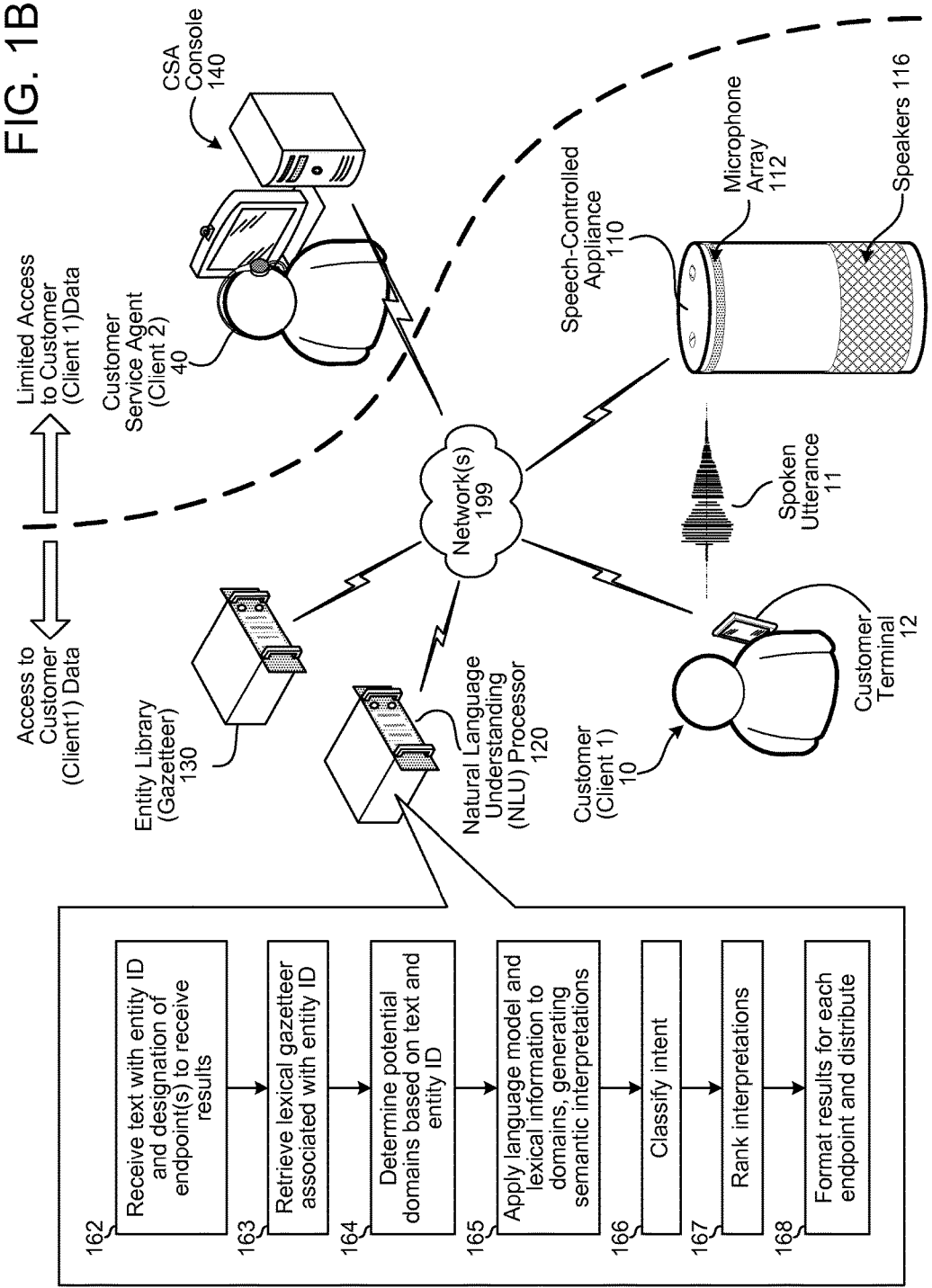

PROVIDING CUSTOMER SERVICE AGENTS WITH CUSTOMER-PERSONALIZED RESULT OF SPOKEN LANGUAGE INTENT

BACKGROUND

Speech recognition systems have progressed to the point where humans can interact with computing devices entirely relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is commonly referred to as speech processing. Speech processing may also convert a user's speech into text data which may then be provided to various text-based software applications.

BRIEF DESCRIPTION OF DRAWINGS

For a more complete understanding of the present disclosure, reference is now made to the following description taken in conjunction with the accompanying drawings.

FIG. 1A illustrates a system in which a customer service agent (CSA) is able to assist a user in resolving speech processing errors when interacting with a speech-controlled appliance.

FIG. 1B illustrates the system from the perspective of the natural language understanding processor, which distributes interpretations of a query entered by the CSA to designated endpoints.

DETAILED DESCRIPTION

Figure 2:
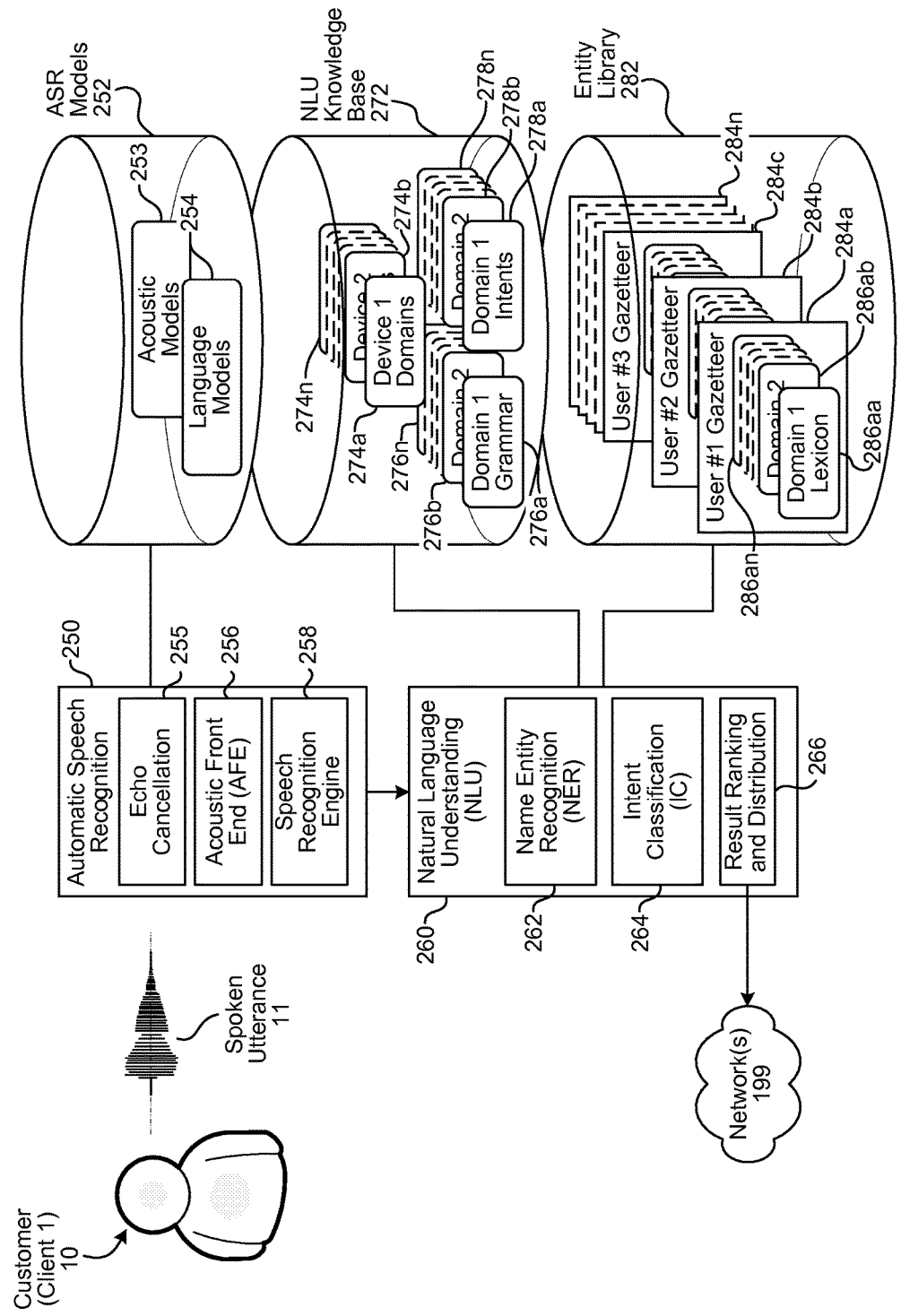
FIG. 2 is a conceptual diagram of how a spoken utterance is processed.

Natural language processing (NLP) is a field of computer science, artificial intelligence, and linguistics concerned with the interactions between computers and human (natural) languages. Natural language processing includes natural language understanding (NLU) and natural language generation (NLG). NLU deals with machine reading comprehension, enabling computers to derive meaning from text input containing natural language. NLG deals with the conversion of a computer-based representation of information into natural language, enabling computers to generate natural language from a machine representation system. Effectively, NLU and NLG are opposite processes, with NLU translating natural language into meaning in the machine representation system, and with NLG translating meaning in the machine representation system into natural language.

Devices that utilize speech processing may provide unique NLU responses that are personalized for a particular user or users. In particular, when natural language understanding (also referred to as NLU processing) is performed to resolve the meaning of a user's utterance, a personalized lexicon specific to the user and knowledge relating specifically to the device being spoken to may be used to resolve ambiguity and interpret meaning. For example, a personalized lexicon may contain a list of words and phrases relating to the titles of music and artists in a user's account and/or stored on the device. Examples of other knowledge that might be used includes a list of words relating to services available on the device, and a history of speech-based interactions with the device.

Words and phrases within the personalize lexicon are represented by lexical information that may link the words and phrases to attributes conveying meaning in the machine representation system. For example, a phrase that is a song title may be tagged with an attribute indicating that the phrase relates to a "song," where the "song" attribute is part of a data structure relating to music files in the machine representation system. Words and phrases within the lexical information may also be linked to other related words and phrases (e.g., linking a song title to an album title and artist).

A customer service challenge for resolving issues with devices that use natural language speech recognition is the ability to determine if a problem the customer is experiencing is due to the device not recognizing the user's words when automatic speech recognition (ASR) converts audio data containing the user's words into text data, or if the device understood their words correctly and the underlying personalized NLU model failed to properly resolve the meaning of a word or phrase (a process called to as "entity resolution"). This is a challenge in part because allowing a customer service agent unfettered access to a device, access to the user's history of speech-based interactions with the device, and access to the user's detailed personal information creates privacy issues for both the user and the customer service provider. In addition, if the customer service agent's suggestions for correction fails to produce the desired response from the device, the result is a bad customer experience.

FIG. 1A illustrates a system in a customer service agent (CSA) 40 is able to assist a customer 10 with obtaining a desired response from a speech-controlled appliance 110 while protecting customer data. The customer service agent 40 submits textual queries to a natural language understanding processor (120) that performs entity resolution using personalized library information stored in an entity library (130) based on the customer identity information ("Customer ID"), a device identifier ("Device ID"), and/or multiple information profiles associated with a shared device ("Household ID"), collectively referred to as an "Entity ID." In addition, the entity library 130 may associate certain Device IDs with a Customer ID or Household ID, or vice-versa. A Household ID may be an aggregation of individual Customer IDs that may include the identifiers of everyone who he registered to use a device (e.g., an appliance shared among household members), or may be a single identifier that includes multiple unique user profiles.

The CSA 40 is shielded from the entity library 130 itself, as well as data stored on the speech-controlled appliance 110. Thus the CSA is 40 capable of operating the NLU environment experienced by the customer 10, without necessarily accessing the customer's private data. An individual customer 10 (client 1) may have access to their own information, and may have partial access to household information related to the appliance (e.g., access to play and list all music aggregated for the household across the multiple customer accounts of the household members that may be played by the appliance 110, and access to the appliance's dialogue history), but are shielded from accessing other private information of the other household members.

The speech-controlled appliance 110 captures a user's spoken utterance 11 via a microphone array 112. The speech-controlled appliance 110 utilizes network-distributed "cloud" services for at least natural language understanding, executing an action in response to a personalized interpreted response received from the NLU processor 120 (via a network or networks 199). The NLU processor 120 provides a personalized result by accessing one or more "gazetteers" stored in an entity library 130. The gazetteers are associated with a user's Customer ID, the appliance's Device ID, and/or a Household ID, and include one or more sets of lexical information associated with the user 10, household, and/or the appliance 110. If the Entity ID includes a Household ID, a single gazetteer may be associated with the Household ID containing aggregated lexicons for all of the associated customer accounts, or a personal gazetteer for each Customer ID associated with the household may be used. The Entity ID is known to the speech-controlled appliance 110, and is provided to the NLU processor 120 to personalize speech processing.

If the personalized interpreted response results in execution of an action by the speech-controlled appliance 110 that was not what the user 10 intended, help can be requested from a customer service agent 40. For example, the speech-controlled appliance 110 may initiate speech processing in response to a specific utterance string such as "Play Songs By Churches." The intended result of this utterance may have been to play a song by an artist "Chvrches." However, the personalized interpretation provided by the NLU processor 120 based on the gazetteer(s) associated with the Entity ID might yields an incorrect interpretation of the utterance as "Play Songs by Charlotte Church." Without personalization, the NLU processor 120 might still fail, providing an interpreted response of "Play Songs by The Church."

The customer service agent (CSA) 40 receives (152) a notification that the utterance was misinterpreted, along with an indication from the customer of what was the desired result. The CSA 40 submits (154), via a console 140, one or more queries to the NLU processor 120 to determine what textual query will obtain the desired result. The NLU processor 120 is also provided the user's Customer ID, Household ID, and/or the appliance's Device ID so that the NLU processor can provide personalized results corresponding to what the user 11 would receive if they uttered the queries as input into the speech-controlled appliance 110, accessing the gazetteer(s) based on the provided Entity ID.

The CSA console 140 receives (156) and displays scored personalized interpreted responses from the NLU processor 120. The CSA 40 can then review the scored responses and recommend (158) a phrase to the customer 10 to obtain the user's desired result.

While the user 10 may access and review personal information stored on the speech-controlled appliance 110 and the cloud, that information is inaccessible to the CSA 40 unless the user 10 provides the information. While the CSA console 140 may identify the user 10, the Entity ID, the appliance 110, and provide other limited information, private information, such as user action records and recorded utterances stored on the appliance 110 (or in the cloud) and the gazetteer information stored in the entity library 130, are protected.

For example, via the console 140, the customer service agent 40 can see beforehand whether or not the command that they want to ask the customer to try would actually work against the user's personalized entity library gazetteer. This allows the CSA 40 to try different commands to see if there are alternate commands which would yield the correct result, or a workaround phrase, such as "Play the Album 'The Bones of What You Believe" which is by Chvrches. Meanwhile, the queries input by the CSA agent 40 are used by the CSA console 140 to create a log of the failed personalized interpreted responses. The log may be used to improve entity resolution by the NLU processor 120. Moreover, resolution does not require that the customer listen to the failed utterances, allowing the CSA 40 to make recommendations that are known to work for the specific user 10 without frustrating the user 10 with responses that will fail.

FIG. 1B illustrates the NLU processor's handling of the customer service queries. The NLU processor 120 receives (162) a text query along with an Entity ID and a designation of one or more endpoints to receive the personalized interpreted responses. Examples of endpoints in the system include the CSA console 140, the speech-controlled appliance 110, and an appliance companion application executed by a customer terminal 12. Examples of an appliance companion application include a software application executed on the customer terminal 12, or a web browser on the customer terminal 12 that accesses a service configured to provide the interpreted results via a web page (e.g., a secure web server the provides the interpreted results as a web page). The customer terminal 12 itself may be a smart phone, tablet computer, or other computer connected to a display. The customer terminal 12 may also be a component of the speech-controlled appliance 110.

Having received (162) the CSA query, the NLU processor uses the Entity ID to retrieve lexical information from the gazetteer stored in the entity library 130. The lexical information includes words and phrases, providing a vocabulary associated with the Entity ID. Within the lexical information, different words and phrase may be linked to other words and phrases, and linked to attributes in the machine representation system associated with the words and phrases (e.g., an "ARTIST" attribute, an "ALBUM" attribute, a "SONG" attribute). For example, a musician's name may be related/linked to the "ARTIST" attribute, and to the album names and song titles by that musician, where the musician, albums, and songs are part of a music collection associated with the Entity ID.

The lexical information may be organized by "domains" related to services, such as the services supported by the particular speech-controlled appliance 110. For example, each domain may represent a discrete set of activities having a common theme, such as a "communication" services, "music" services, "calendaring" services, etc. Each domain may be associated with its own lexical information, and at least some of the domain-specific lexical information may be specific to the Entity ID. For example, the "music" domain may contain words relating to album titles, song titles and artists associated with a user's music library and/or a household's combined library. Personalized and appliance-specific domain information may be stored in the entity library 130, whereas generic domain information may be stored in the NLU processor's own knowledge base. Both personalized and generic domain information may be used to resolve a single query.

The NLU processor 120 determines (164) potential domains for the interpreted response by comparing words in the CSA query with the lexical information associated with the retrieved domain information. For example, based on words in the text query, the NLU processor may narrow down the potential domains to "communication" related services and "music" related services.

The NLU processor 120 applies (165) a language model and lexical information for the selected domains, generating one or more semantic interpretations of the query. The NLU processor 120 also classifies (166) the "intent" of the sematic interpretations, where the intent is an action associated with a respective domain that can be executed by the appliance 110. For example, the music domain may include actions such as "play music," "pause music," "next track," etc. Based on the domain and the semantic interpretation, an intent may be determined. For example, if an interpretation is associated with the music domain, and the semantic interpretation includes an action word "play" that is included in a vocabulary for the domain, the "play music" intent may be selected for that interpretation. If a domain, an intent, and an interpretation are output to the appliance 110, the domain instructs the appliance which service to activate, and the intent serves as a command to that service.

The NLU processor 120 ranks (167) the interpretations based on a scoring criteria. Thereafter, the NLU processor 120 formats (168) the results for each designated endpoint, and distributes the formatted results. For example, the CSA console 140 may be provided with a sorted list of every interpreted result exceeding a threshold score, or a sorted list of up to "N" results that exceed the threshold score. The sorted list may be formatted as text or using a mark-up language such as HyperText Markup Language (HTML) or Extensible Markup Language (XML). The appliance 110 may be provided a machine-readable data structure conveying the domain and intent of the highest ranking interpreted result, and one or more XML strings comprising the semantic interpretation. The customer's terminal 12 may be provided with a sorted list of up to "P" results that exceed a threshold score, where P is less than or equal to N. The minimum threshold score used to filter the sorted list sent to customer's terminal 12 may be higher than that used for lists sent to the CSA console 140. The list sent to the customer's terminal may also be simplified from that sent to the CSA console 140, such as including raw score in the list sent to the CSA, but providing only qualitative scores to the customer.

The ability to select endpoints provides the customer service agent a variety of choices. Instead of having "dead air" while the customer waits for a suggestion, the customer can watch the process via their terminal 12. In addition to engaging the customer 10 in the process, the ability to observe the results that the customer service agent receives from the NLU processor 120 in response to the text queries may provide the customer with ideas of how to approach independently resolving future problems with the speech processing system on their own, while at the same time seeing the that the CSA 40 is actively engaged in the process (as compared to giving the impression that the CSA is instructing the customer to try prewritten responses that do not work). Another option is to push the top ranked result of a query directly to the appliance 110, so as to receive feedback directly from the customer 10. This choice may be particularly advantageous after the CSA agent has determined that a solution works, or as another approach to engaging the customer in the process as the CSA agent reviews options. If a solution works correctly when directed to the appliance 110 by the CSA 40, but still fails when the user 10 utters the same query, the cause of the problem can be narrowed down to ASR processing (e.g., due to the user's pronunciation, due to a shortcoming of the ASR acoustic and language models, etc.).

FIG. 2 is a conceptual diagram of how a spoken utterance is processed. The difference between a customer's spoken utterance and a query from the CSA console 140 is two-fold. First, the personalized response to a query originating with a spoken utterance 11 received by the appliance 110 is ordinarily returned to just the appliance as the endpoint. Second, a query from the CSA 40 may be initially entered as text, rather than as speech, such that the automatic speech recognition (250) portion of the process may be bypassed (delivering a text query directly to the natural language understanding (260) process).

The ASR process 250 converts an utterance 11 including speech into text. The ASR transcribes audio data into text data representing the words of the speech contained in the audio data. The text data may then be used by other components for various purposes, such as executing system commands, inputting data, etc. A spoken utterance in the audio data is input a processor configured to perform ASR which then interprets the utterance based on the similarity between the utterance and pre-established language models 254 stored in an ASR model knowledge base (ASR Models Storage 252). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted may each be assigned a probability or a recognition score representing the likelihood that a particular set of words matches those spoken in the utterance. The recognition score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Based on the considered factors and the assigned recognition score, the ASR process 250 outputs the most likely words recognized in the audio data. The ASR process may also output multiple alternative recognized words in the form of a lattice or an N-best list with corresponding probability scores.

The device or devices performing the ASR process 250 may include an echo cancellation filter 255, an acoustic front end (AFE) 256 and a speech recognition engine 258. The echo cancellation filter 255 compares audio that is output by the speaker(s) 116 of the appliance 110 with sound picked up by the microphone array 112 (or some other microphone used to capture spoken utterances, such as a microphone associated with the terminal 12), and removes the output sound from the captured sound in real time. Echo cancellation is commonly used by cellular telephones and other telephones operating as speaker phones, and facilitates the ASR process by removing a component of captured sounds that can interfere with speech recognition.

The acoustic front end (AFE) 256 transforms the audio data after echo cancelation into data for processing by the speech recognition engine. The speech recognition engine 258 compares the speech recognition data with acoustic models 253, language models 254, and other data models and information for recognizing the speech conveyed in the audio data. The AFE may reduce noise in the audio data and divide the digitized audio data into frames representing a time intervals for which the AFE determines a set of values, called a feature vector, representing the features/qualities of the utterance portion within the frame. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 258 may process the output from the AFE 256 with reference to information stored in speech/model storage (252). Alternatively, post front-end processed data (such as feature vectors) may be received by the device executing ASR processing from another source besides the internal AFE. For example, the appliance 110 may process audio data into feature vectors and transmit that information to a server across a network 199 for ASR processing. Feature vectors may arrive at the server encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a textual representation of the speech, an N-best list, lattice, etc. may be sent to a natural language understanding (NLU) network server 120 for NLU processing, such as conversion of the text into commands for execution by the appliance 110.

The ASR result may also be sent to a command recognition module of the appliance 110. A command recognition module may provide a limited NLU capability for recognizing basic commands such as "wake" words used to fully active the appliance when operating in a standby mode. Recognition of such command words may be performed by a direct comparison of words in the ASR results to a list of command words, and/or use limited NLU processing to apply grammar rules and determine intent.

The device performing NLU processing 260 (e.g., NLU processor 120) may include various components, including potentially dedicated processor(s), memory, storage, etc. A device configured for NLU processing may include a named entity recognition (NER) module 252 and intent classification (IC) module 264, a result ranking and distribution module 266, and knowledge base 272. The NLU process also utilizes personalized gazetteer information (284a-284n) stored in entity library storage 282 (e.g., on the entity library server 130).

The NLU process takes textual input (such as a processed utterance from ASR 250 or entered at the CSA console 140 as text) and attempts to make a semantic interpretation of the text. That is, the NLU process determines the meaning behind the text based on the individual words and then implements that meaning. NLU processing 260 interprets a text string to derive an intent or a desired action from the user as well as the pertinent pieces of information in the text that allow a device (e.g., appliance 110) to complete that action. For example, if a spoken utterance is processed using ASR 250 and outputs the text "call mom" the NLU process may determine that the user intended to activate a telephone in his/her device and to initiate a call with a contact matching the entity "mom."

As will be discussed further below, the NLU process may be configured to parsed and tagged to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result).

To correctly perform NLU processing of speech input, the NLU process 260 may be configured to determine a "domain" of the utterance so as to determine and narrow down which services offered by the endpoint device (e.g., appliance 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition module 262 receives a query in the form of ASR results or text from the CSA console 140, and attempts to identify relevant grammars and lexical information that may be used to construe meaning. To do so, a name entity recognition module 262 begins by identifying potential domains that may relate to the received query. The NLU knowledge base 272 includes a databases of devices (274a-274n) identifying domains associated with specific devices. For example, the appliance 110 may be associated with domains for music, telephony, calendaring, contact lists, and device-specific communications, but not video. In addition, the entity library may include database entries about specific services on a specific device, either indexed by Device ID (not shown), User ID (also not shown, but included in the user-specific gazetteers 284a-284n), or Household ID (not shown). As noted above, Household ID entries may be organized as an aggregated database entry, or a Household ID may be associated with multiple Device IDs.

A domain may represent a discrete set of activities having a common theme, such as "shopping", "music", "calendaring", etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the gazetteer for User #1 (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

A query is processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result.

An intent classification (IC) module 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 260 may parse the query to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 260 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones," but based on grammar rules and models, it is determined that these phrase relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the a slot/field using gazetteer information, the NER module 262 may search the database of generic words associated with the domain (in the NLU's knowledge base 272). So for instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried, potentially producing two different results.

The comparison process used by the NER module 262 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

Grammatical tagging may result in tagging errors, or multiple possible tags may be assigned to the same words. For example, an incorrect response to the query of "play mother's little helper by the rolling stones" might result in misidentifying the domain and the intent based on the word "helper," and associate the word "play" with the album "Play" by the artist Moby. Such a result will ordinarily be scored lower than the correct result as other words in the query are unrelated, but had Moby's album "Play" included a song "Mother's little helper" or the lexical information otherwise includes similar phrases, the result might cause an endpoint device to act to provide a "help" response related to Moby's album. The chances of such a misidentification increase if the album "Play" is in the user's library, but the Rolling Stone's song "Mother's Little Helper" is not.

The NER modules 262 may also use contextual operational rules to fill slots. For example, if a user had previously requested to pause a particular song and thereafter requested that the voice-controlled device to "please un-pause my music," the NER module 262 may apply an inference-based rule to fill a slot associated with the name of the song that the user currently wishes to play—namely the song that was playing at the time that the user requested to pause the music.

The results of NLU processing are tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

A result ranking and distribution engine 266 sorts the interpreted results based on the classifying score assigned to each interpreted result. A qualitative rank may be assigned based on predefined thresholds, such as a range of scores assigned "high," a range of scores assigned "medium," and a range of scores assigned "low."

The ranking and distribution engine 266 then formats the results depending upon the endpoint or endpoints designated with the query. For example, the CSA console 140 may be provided with a sorted list of every interpreted result exceeding a threshold score, or a sorted list of up to "N" results that exceed the threshold score. The sorted list may be formatted as text or using a mark-up language such as HyperText Markup Language (HTML) or Extensible Markup Language (XML). The appliance 110 may be provided a machine-readable data structure conveying domain and intent of the highest ranking interpreted result, and one or more XML strings comprising the semantic interpretation. The appliance 110 may instead (or also) be provided an explicit machine readable instruction, such as a command to play music and an index code identifying the song to be played. The customer's terminal 12 may be provided with a sorted list of up to "P" results that exceed a threshold score, where P is less than or equal to N. The threshold score used to filter the sorted list sent to customer's terminal 12 may be higher than that used for lists sent to the CSA console 140. The list sent to the customer's terminal may also be simplified from that sent to the CSA console 140, such as including raw score in the list sent to the CSA, but providing only qualitative ranks to the customer.

Figure 3:
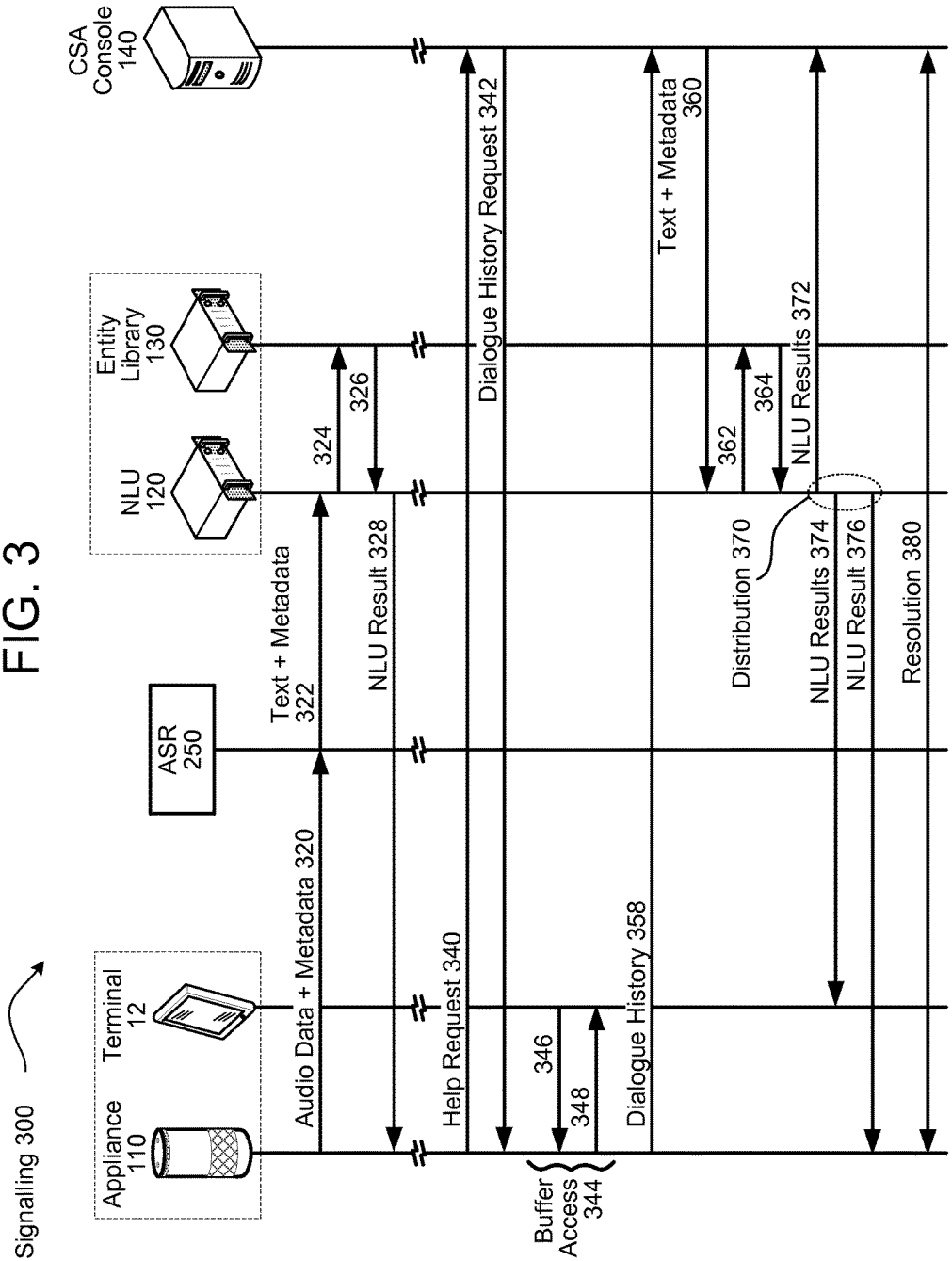
FIG. 3 illustrates an example signal flow diagram illustrating speech processing and error resolution.

FIG. 3 illustrates a signal flow diagram 300 illustrating then handling and resolution of queries in the system. The appliance 110 receives a spoken utterance 11, which is sent (320) to the automatic speech recognition (ASR) system 250 as audio data. As noted above, portions of the ASR system may be built into the appliance 110 (e.g., the echo cancellation 255, the acoustic front end 256), and other portions may be reached via the network. The speech recognition system 258, for example, may be on a standalone server (not illustrated), or may be implemented on the same server performing NLU processing 260 (e.g., on NLU Processor 120). If the ASR system 250 is separate from the appliance 110, metadata may be forwarded as well, such as an Entity ID (e.g., Customer ID, Device ID, Household ID).

The ASR system 250 sends (322) text from the processed utterance, together with the metadata, to the NLU processor 120. If the ASR system 250 is separate from the appliance 110, the ASR result may also be sent back to the appliance (or some other repository) so that it may be logged in a circular buffer used to record the customer's dialogue history. Based on the Entity ID in the metadata, the NLU processor 120 requests (324) gazetteer information from the entity library 130. The entity library replies (326) with available gazetteer information. These transactions may be performed in multiple steps to reduce the volume of data included in the transactions. For example, the NLU processor 120 may first identify domains based on a domain database 274 in the NLU knowledge base 272, and query the entity library 120 to determine whether there are specific services associated with the appliance's Device ID. The NLU processor 120 may then identify potential domains, and query the entity library for personalized lexicons 286 for the specific user or household (based on the User ID, a group of User IDs associated with the household, or a Household ID) and those specific identified domains.

The metatdata from the appliance 110 may also designate the appliance itself as the endpoint, or the result ranking and distribution engine 266 may be configured to default to sending results to the originating endpoint if no endpoint is designated. NLU processor 120 then selects the highest score result, formats it for the appliance 110, and sends (328) the formatted result to the appliance 110 for execution as an action.

If the interpreted result produces an unsatisfactory response from the appliance 110, the user can request (340) help from customer service. Requesting help may comprise, for example, pushing a button on the appliance 110, in response to which the appliance 110 initiates and voice over Internet Protocol (VoIP) call to the CSA console 140, forwarding metadata such as an Entity ID. The call may also be initiated by a speech command to the appliance (e.g., "Call Customer Service" or "Help"). If initiated as a speech command, transactions 320 to 328 are repeated, with the NLU result causing the appliance 110 to initiate a VoIP call to the CSA console 140, and forwarding the CSA console 140 metadata (e.g., Entity ID). Similarly, if the request (340) is initiated through an interaction with the terminal 12, the terminal 12 may initiate a VoIP call or other communication channel to the CSA console 140, forwarding the CSA console 140 the metadata. In the alternative, the customer 10 may request assistance by telephone, and provide the customer service agent 40 with a Customer ID, Household ID, and/or Device ID.

Figure 4:
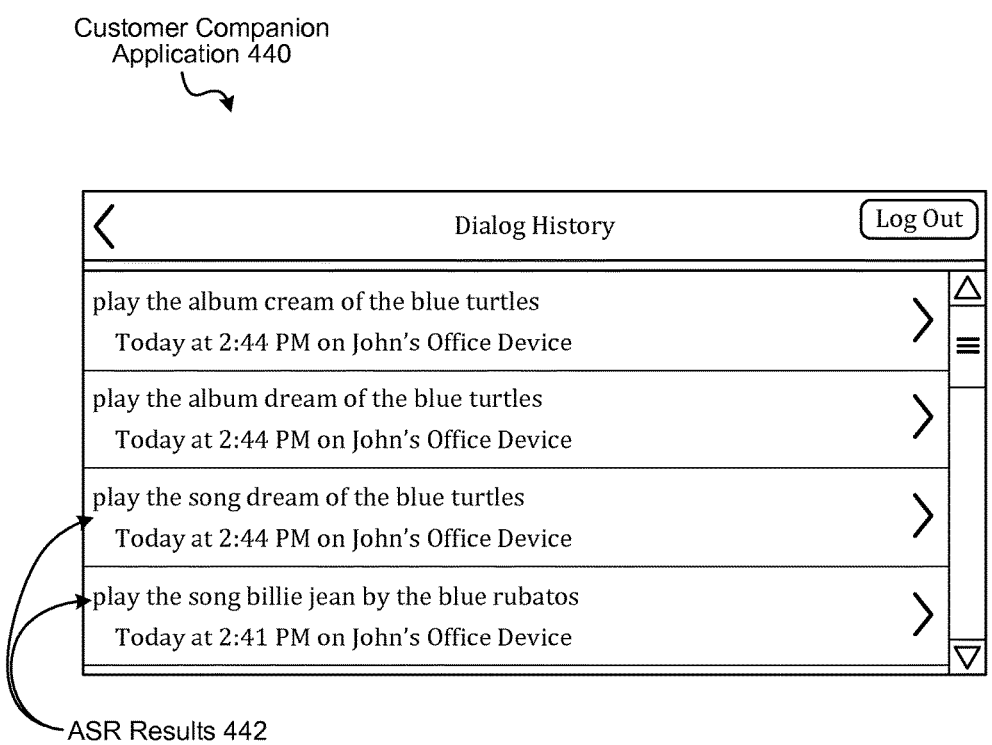
FIG. 4 illustrates an interface of a software application allowing the customer to access a speech-interaction dialogue history.

Neither the customer service agent 40 nor the CSA console have access to the customer's dialogue history. As illustrated in FIG. 4, using an appliance companion application 440 on a customer terminal 12, the customer 40 can access their own appliance's circular buffer that stores a dialogue history of ASR results, or some other secure repository, if the circular buffer exists in the "cloud." The circular buffer may also store a pulse-code modulated recording of the corresponding spoken utterance, and provide the personalized interpreted NLU result received from the natural language understanding processor 120. The customer 10 may either read the information to the CSA 40 (via the VoIP call), or the customer companion application may allow the customer to select history entries and forward the history entries to the CSA console 140. Other options may include the customer 10 using the companion application or a speech-based command to release a defined range or period of history entries to the CSA console 140, such as releasing the last half-hour, the last two hours, the last five entries, etc.

In FIG. 3 buffer access 344 is illustrated as a query (346) from the customer's terminal 12 to the appliance, with the appliance 110 responding (348) with the dialogue history. Other transactions may be included, such as the aforementioned forwarding of customer selected portions of the dialogue history by the appliance 110 to the CSA console 140.

If the customer elects to provide (358) at least a portion of the dialogue history, either by reading the portions out loud over the VoIP link or by instructing the appliance 110 to send the portions electronically, this information informs the CSA as to what queries are known to fail. The CSA console 140 then sends (360) a text query composed by the CSA, along with metadata such as an Entity ID (e.g., the customer's Customer ID, a Household ID, and/or the appliance's Device ID) and designated endpoint to receive the results.

The NLU 120 then has an exchange (362, 364) with the entity library 130, providing the Entity ID and receiving gazetteer information. As noted above, this may be performed as a series of transactions to reduce the amount of secure data included in the transaction, such as having the NLU first determine potential domains, and then limiting follow-up to gazetteer information relevant to those domains.

The NLU 120 then distributes (370) the formatted results to the endpoint or endpoints specified in the query, such as NLU results being sent (372) to the CSA console 140, NLU results being sent (374) the companion application on the customer's terminal 12, and the top-ranked NLU result being sent (376) to the appliance 110. The results sent to the companion application 440 may either be sent (among other ways) directly, relayed to the terminal 12 through the appliance 110, relayed to the terminal 12 through a separate service (e.g., accessed through a customer's account), etc.

The customer 10 and the CSA 40 can then resolve (380) whether the solution was successful, and discuss any suggestions the CSA 40 may have for making similar queries in the future.

Although the circular buffer holding the customer's dialogue history is illustrated in FIG. 3 as being on the appliance 110, it may also be stored in the "cloud" over the network(s) 199, such as on a secure server where customer data is stored (e.g., stored on the server 130 providing the entity library 282).

Also, the terminal 12 may be more integrated in the transactions illustrated in FIG. 3. For example, a microphone on the terminal 12 may be capture the audio data comprising utterance 11 and transmit it to the appliance 110 via a wireless networking connection. Or the audio data may be forwarded directly from the terminal 12 to the ASR 250 (which may be independent or included at least in part in the terminal 12 itself), with the NLU 120 returning the NLU results 376 for the appliance 110 to the terminal 12 for relaying to the appliance 110 (or directly to the appliance 110 as illustrated). Likewise, the help request 240, the dialogue history request 342, and/or the dialogue history response may originate with the terminal 12.

One obvious difficulty with entity resolution is that an uttered word or phrase may be polysemous, that is a single mention word or phrase may potentially refer to multiple different entities. For example, a mention "John" may refer to many different entities (including potentially a bathroom), "Springfield" may refer to a person, a city, etc. Another difficulty is that multiple different mentions, name variations, aliases, etc. may refer to the same entity. For example mentions "the boss", "bruce", "springsteen" may all refer to the entity Bruce Springsteen. And even those may refer to multiple entities, for example "springsteen" may also refer to the entity "Bruce Springsteen and the E Street Band" (a different canonical entity) or "the boss" may refer to the speaker's employer, depending on the circumstances. Another difficulty is potential variation in the mention caused by such things as ASR errors, noise, etc. For example, a speaker with a strong accent may say "John" but that may be transcribed as "Jean" by the ASR module 250. Another difficulty is that written and spoken forms of a mention may be different, yet may refer to the same entity. For example, musical artist Deadmau5 may be verbalized as "dead mouse" or musical artist P!nk verbalized as "pink." Correct entity resolution desirably accounts for all or some of for such difficulties and variations.

FIGS. 5 to 11 illustrate examples of an interface used by the customer service agent to interact with the natural language understanding (NLU) processor in an effort to determine a query that will provide the customer with the desired result.

Figure 5:
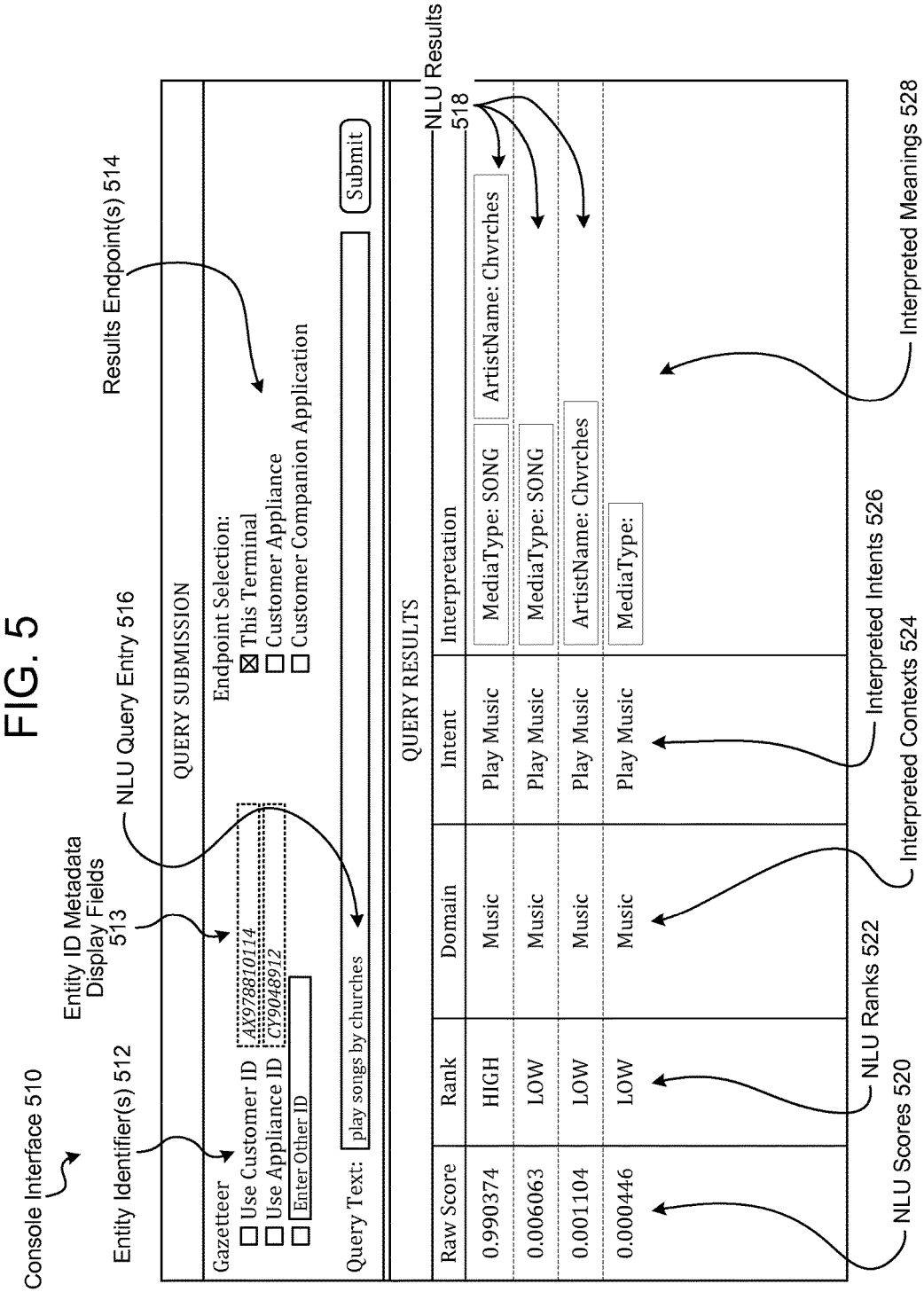
FIGS. 5 to 11 illustrate examples of an interface used by the customer service agent to interact with the natural language understanding (NLU) processor.

FIG. 5 illustrates a console interface 510 on the CSA console 140 used by the CSA 40 to enter queries to the NLU system 260 (on NLU processor 120) and view the NLU results. As no Entity ID 512 is designated, the NLU uses a default gazetteer (e.g., a gazetteer used for testing not associated with a particular person or device). The CSA console 140 is designated as the endpoint 514 to receive the query results.

Also illustrated are Entity ID metadata display fields 513, illustrating the Customer ID(s) and the Appliance ID received in metadata. A Household ID may be indicated as a single Customer ID (e.g., an aggregated gazetteer for the entire household), by there being multiple IDs in the Customer ID field, or in a separate Household ID field (not illustrated).

The CSA has entered an NLU query (516) to "Play songs by churches." The NLU processor has returned four results 518. Each result comprises an NLU raw score 520, a qualitative NLU rank 522, the domain corresponding to the context 524, the intent 526, and the interpreted meaning 538. The interpreted meaning 528 of each result corresponds to the slot or slots filled by the NER module 1342 using the aforementioned frameworks. The top-rated response indicates an intent to play music, that the media type is "song," and the artist is "Chvches." The result indicates that for this query, a default speech-controlled appliance (e.g., a test platform) would play songs by the group Churches.

Figure 6:
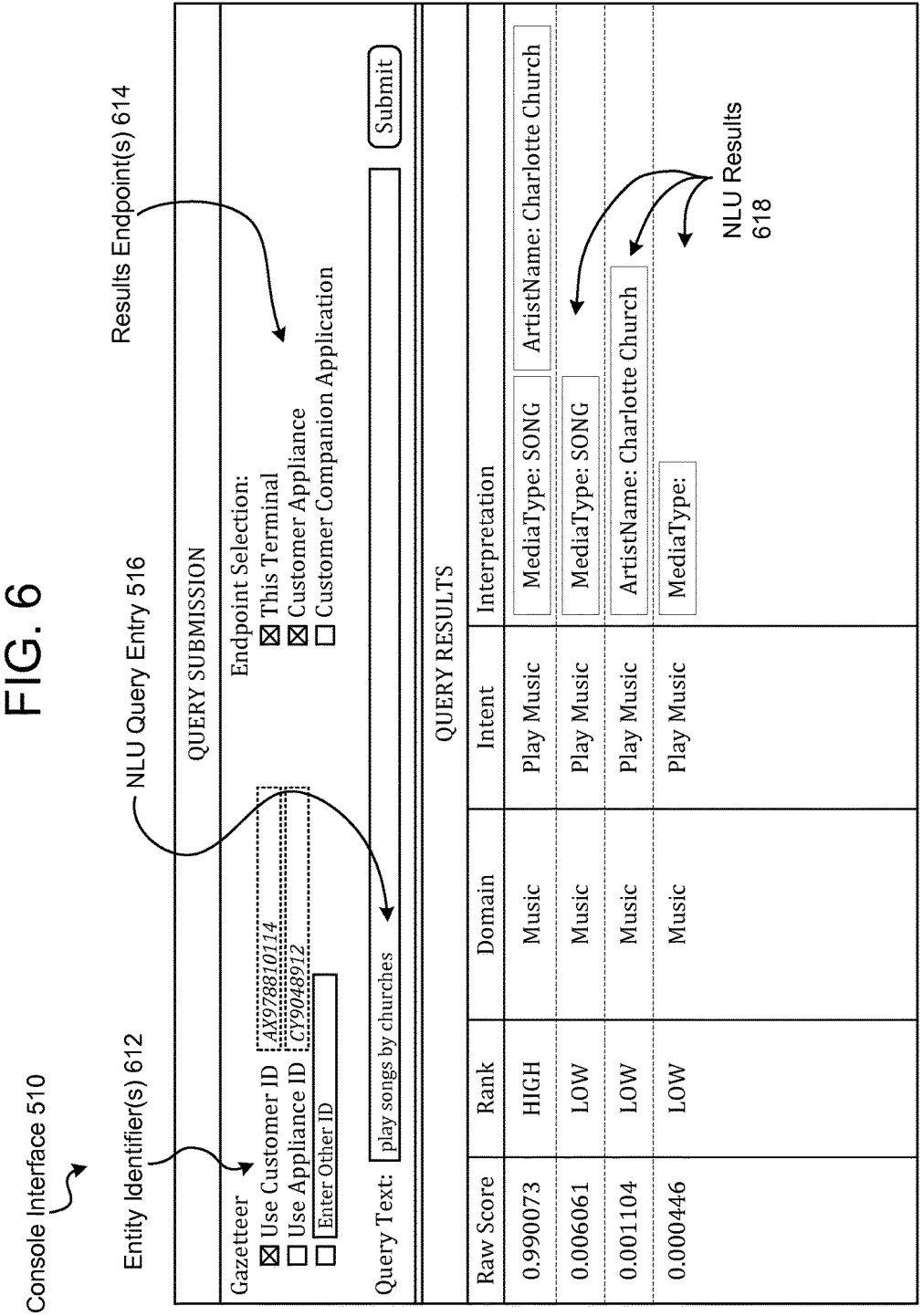

In FIG. 6, the CSA 40 has changed the designated Entity ID (612) to use the Customer ID (e.g., a Customer ID received in metadata included with a CSA help request 340). As a result, the NLU obtains the customer's gazetteer to resolve the same query as used in FIG. 5. Due to differences in lexical information between the default gazetteer and the user's gazetteer, the NLU results 618 are different. The top-ranked result still indicates an intent to play music and the media type is still "song," but the artist has changed to "Charlotte Church" due to a difference in gazetteers. This result would cause the appliance 110 to play songs by Charlotte Church.

FIGS. 7 to 11 illustrate the console interface 510 as the CSA enters variations on a query to play Sting's album "Dream of the Blue Turtles." As illustrated in FIG. 4, the user 10 previously attempted to play this album using multiple spoken utterances 11. As illustrated in the dialogue history in FIG. 4, the user's queries produced a variety of ASR results, in addition to producing unexpected NLU results. As illustrated in FIG. 4, even when the ASR results produced "play the album dream of the blue turtles," speech processing failed. Among other reasons such a failure can occur is that the phoneme vectors generated in ASR processing were assigned low confidence/weak scores below a minimum threshold score (e.g., due to a heavily accented pronunciation), resulting in the speech command not being executed.

Figure 7:
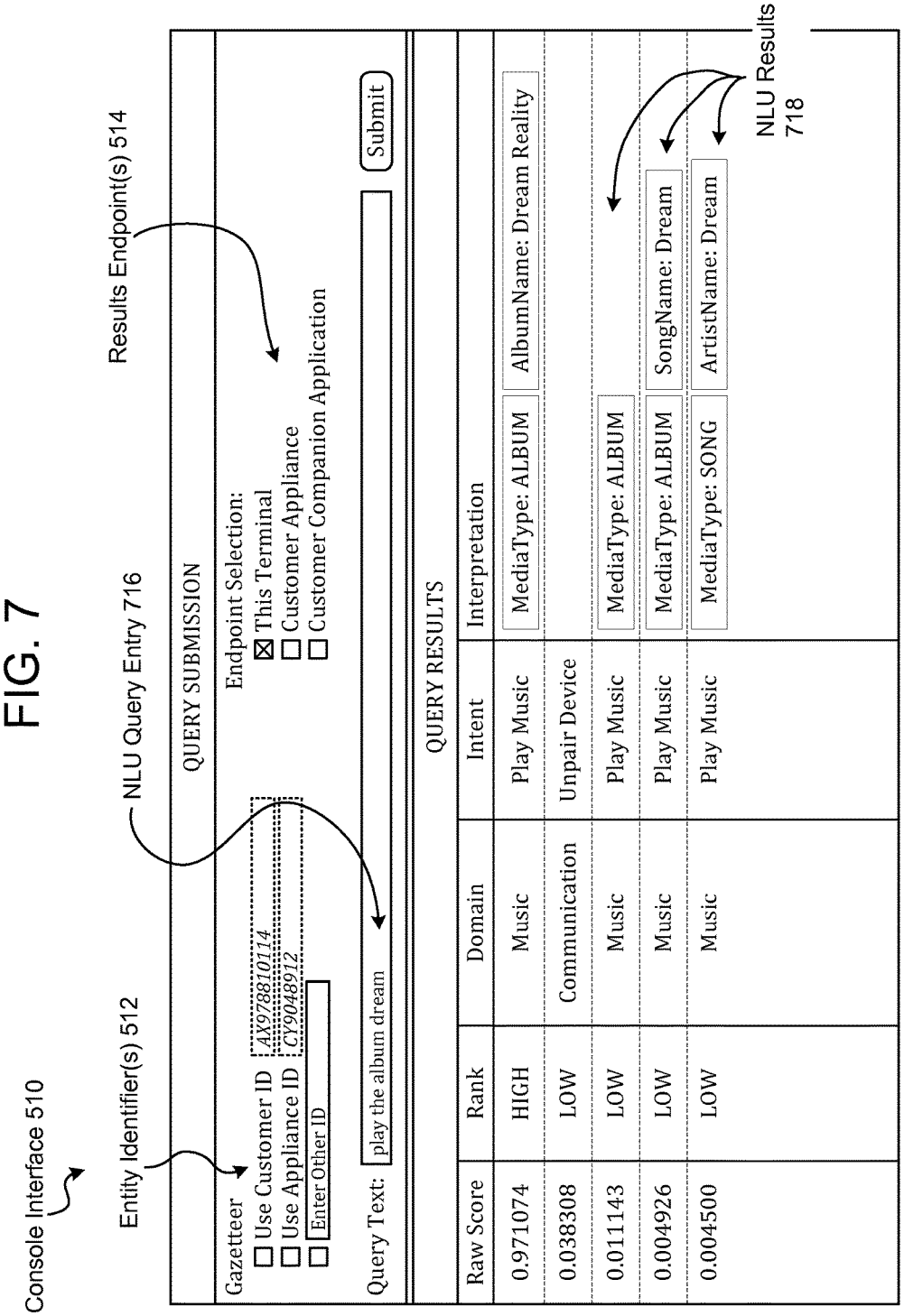

In FIG. 7, the CSA 40 had entered a query (716) "play the album dream" for NLU processing using the default gazetteer (a generic test profile), producing NLU results 718. The highest-ranked result would result in a speech-controlled appliance playing an album entitled "Dream Reality."

Figure 8:
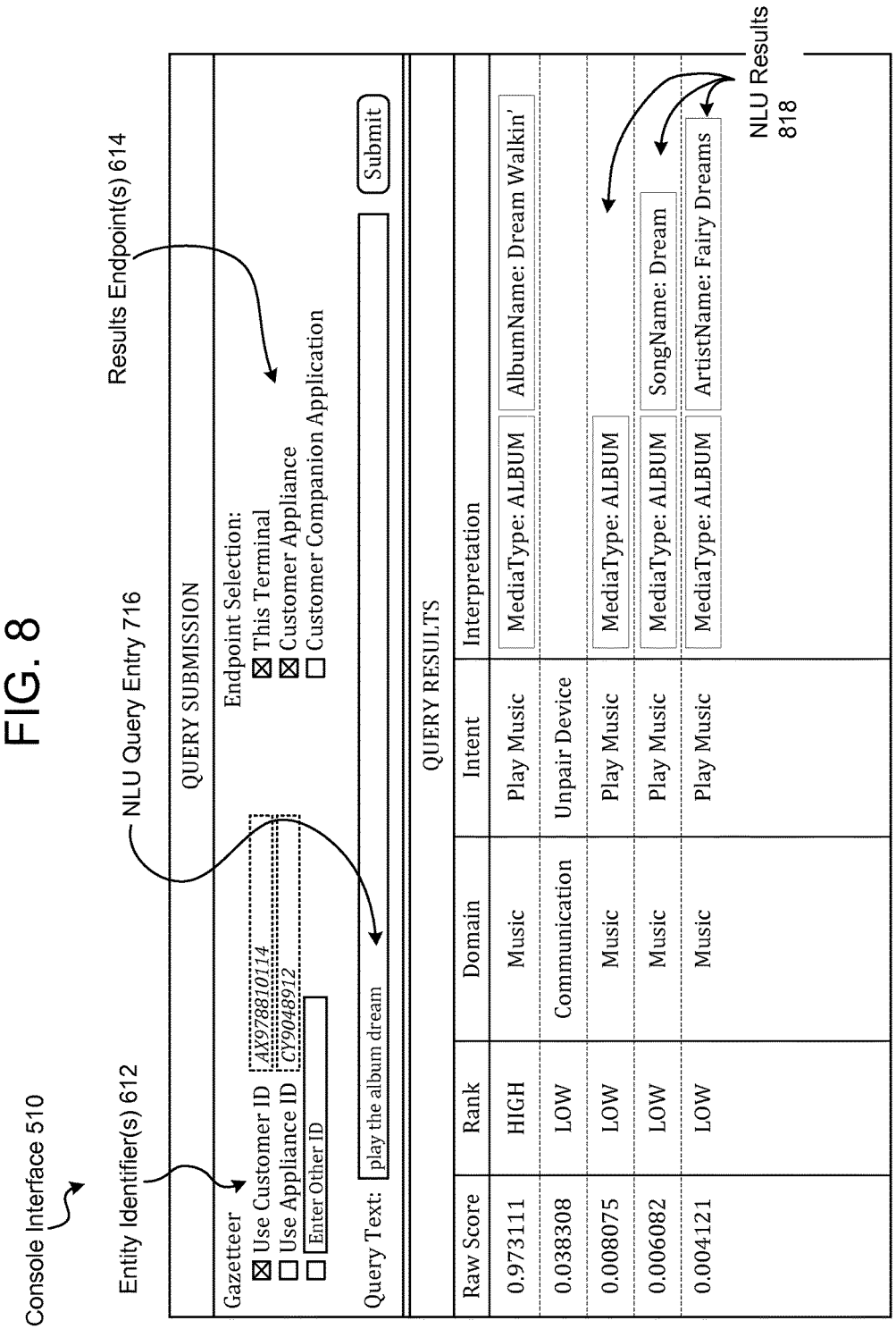

In FIG. 8, the CSA 40 repeat the query, but changes the designated Entity ID to the Customer's ID, and designates both the customer's appliance 110 and the CSA console 140 as the designated endpoint 614. Due to the change in gazetteers, the results 818 are again different. In this example, the query 716 results in an instruction to the appliance to play an album entitled "Dream Walkin'."

Figure 9:
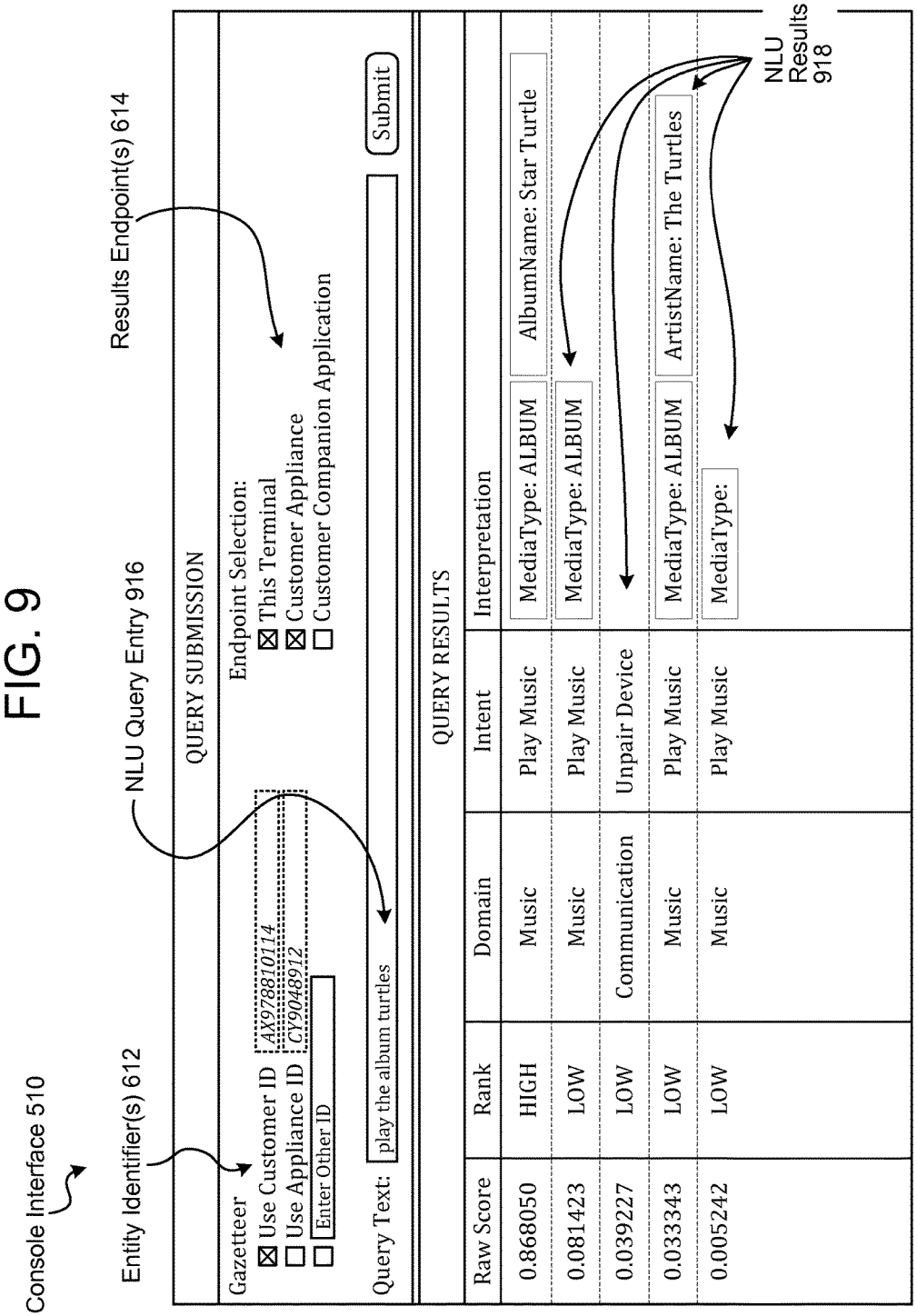
Figure 10:
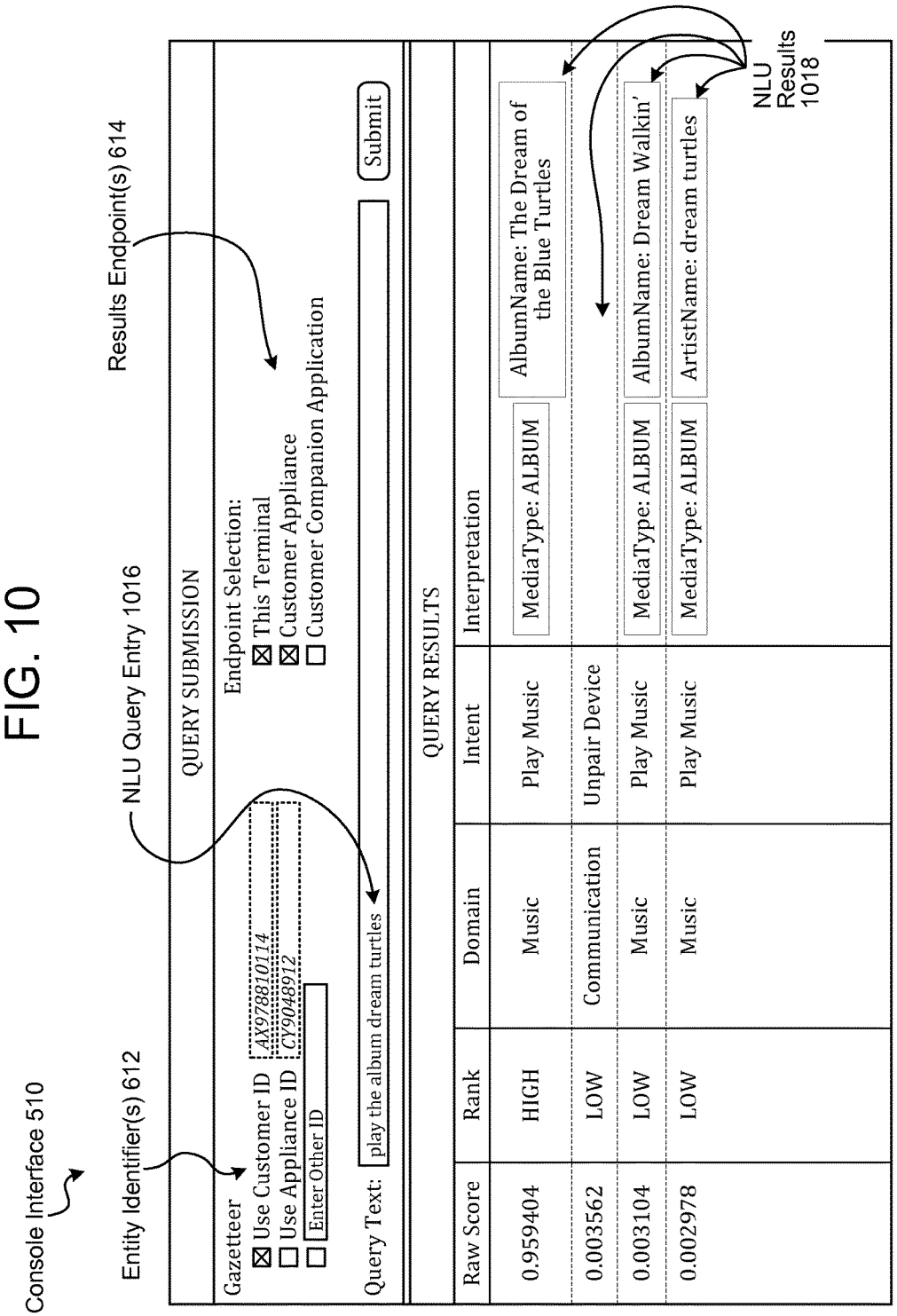
Figure 11:
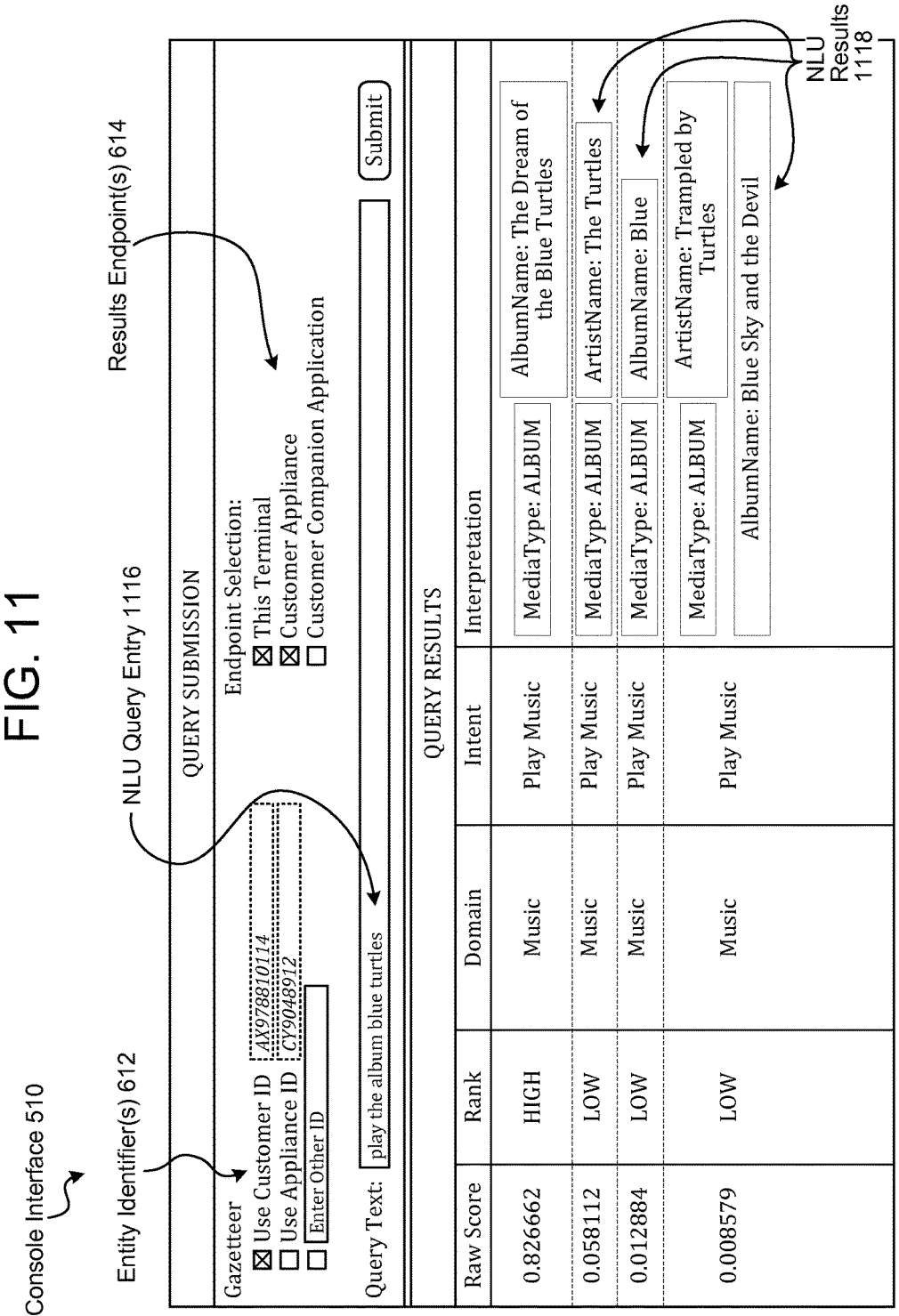

In FIG. 9, the CSA 40 tries a query (916) "play the album turtles," again using the Customer ID. Of the NLU results 918, the top-rated result is to play an album entitled "Star Turtle." In FIG. 10, the CSA 40 tries a query (1016) "play the album dream turtles." Of the NLU results 1018, the top-rated result is to play the album "The Dream of the Blue Turtles," which what the customer was intending to play (referring back to the dialog history in FIG. 4). In FIG. 11, the CSA 40 tries a query (1116) "play the album blue turtles." Of the NLU results 1118, the top-rated result is also to play the album "The Dream of the Blue Turtles." Based on these results, the CSA 40 can make recommendations to the customer 10 as alternatives to uttering the entire album title if the album title is producing the expected results.

Figure 12:
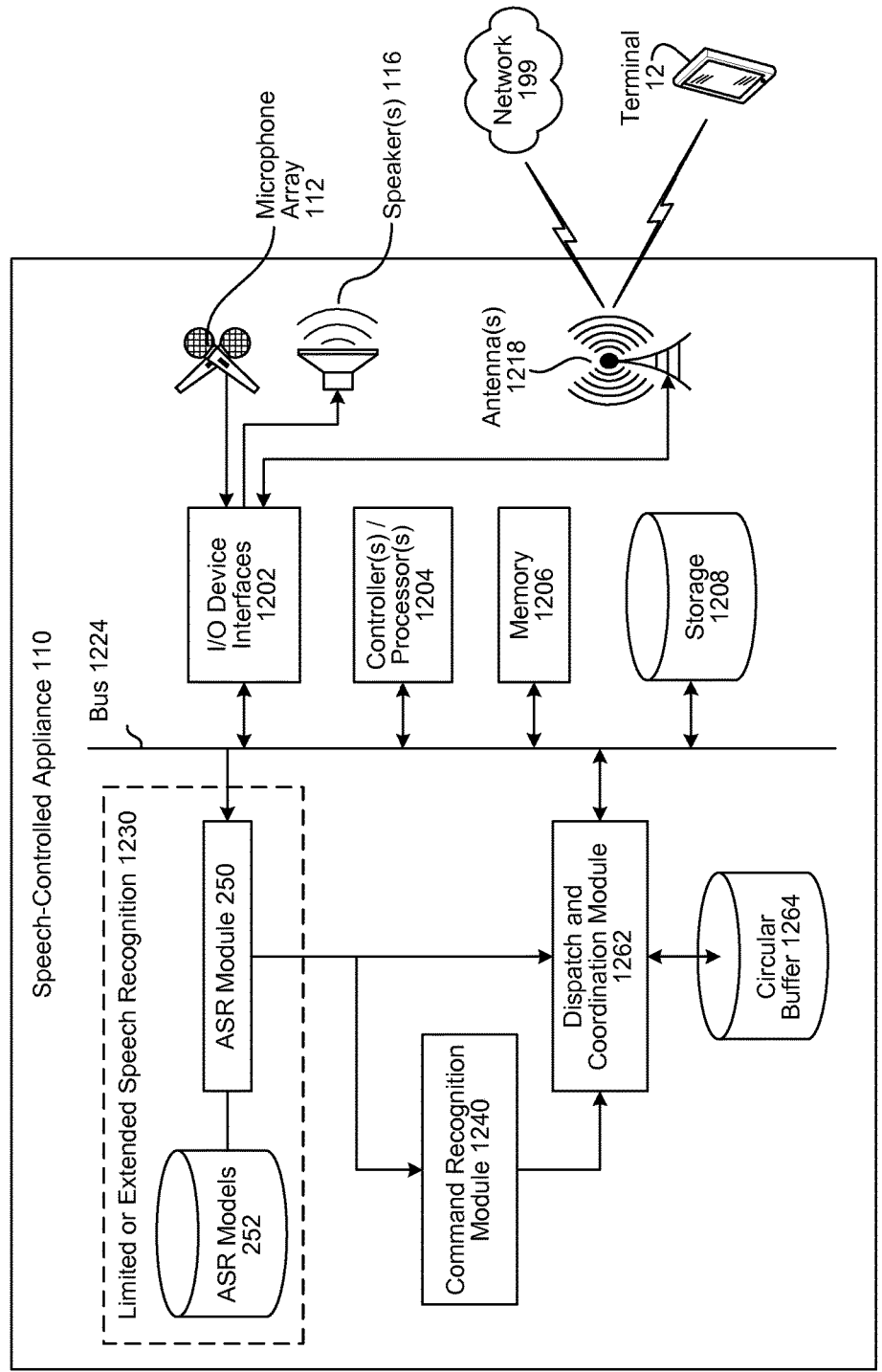
FIG. 12 is a block diagram conceptually illustrating example components of the speech-controlled appliance.
Figure 13:
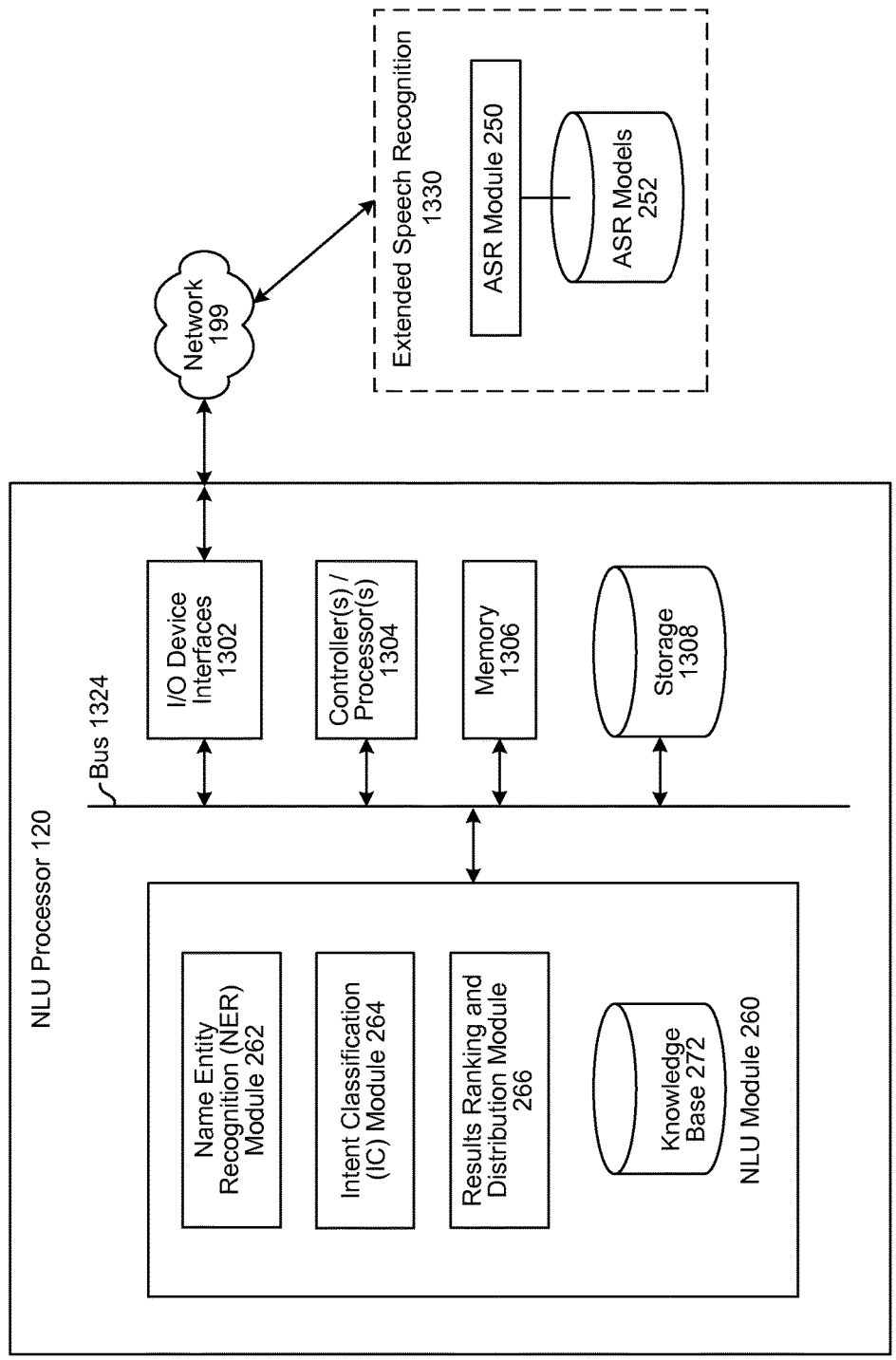
FIG. 13 is a block diagram conceptually illustrating example components of the natural language understanding (NLU) processor.
Figure 14:
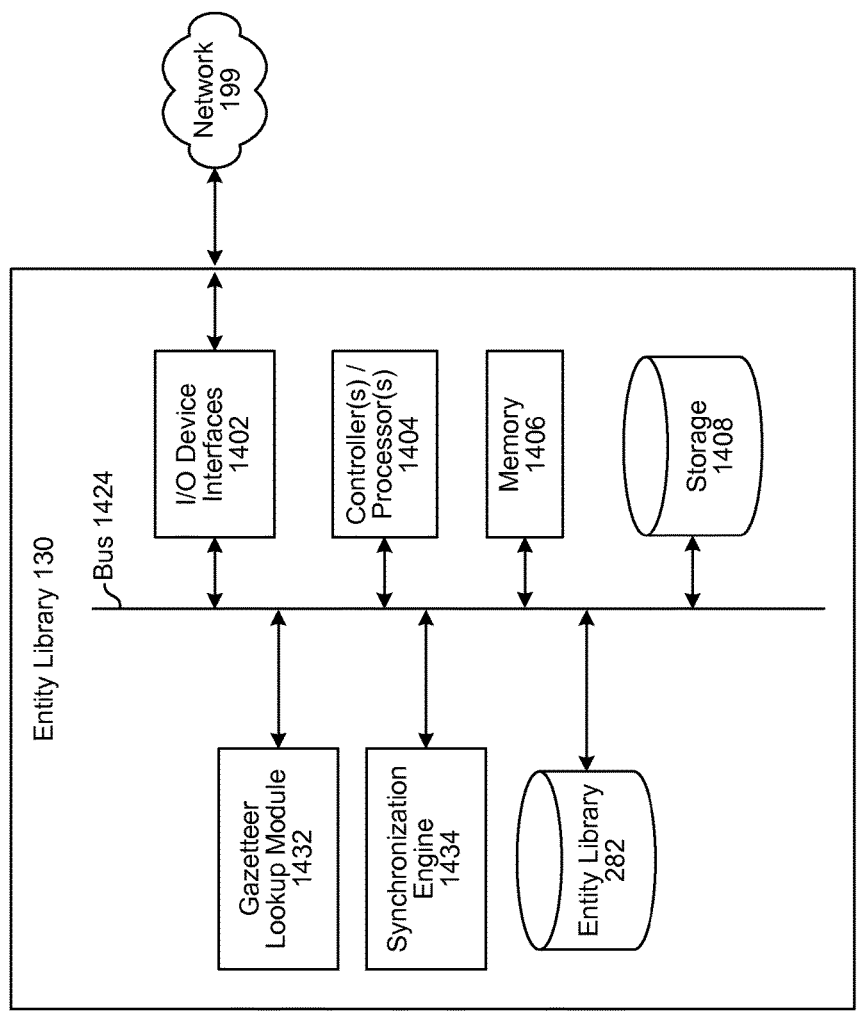
FIG. 14 is a block diagram conceptually illustrating example components of an entity library system that manages customer gazetteers.

FIG. 12 is a block diagram conceptually illustrating example components of the speech-controlled appliance 110. FIG. 13 is a block diagram conceptually illustrating example components of the NLU processor 120. FIG. 14 is a block diagram conceptually illustrating example components of the entity library 130. In operation, each of these devices may include computer-readable and computer-executable instructions that reside on the respective device (110/120/130), as will be discussed further below.

Each of these devices (110/120/130) may include one or more controllers/processors (1204/1304/1404), that may each include a central processing unit (CPU) for processing data and computer-readable instructions, and a memory (1206/1306/1406) for storing data and instructions of the respective device. The memories (1206/1306/1406) may individually include volatile random access memory (RAM), non-volatile read only memory (ROM), non-volatile magnetoresistive (MRAM) and/or other types of memory. Each device may also include a data storage component (1208/1308/1408), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1202/1302/1402).

Computer instructions for operating each device (110/120/130) and its various components may be executed by the respective device's controller(s)/processor(s) (1204/1304/1404), using the memory (1206/1306/1406) as temporary "working" storage at runtime. A device's computer instructions may be stored in a non-transitory manner in non-volatile memory (1206/1306/1406), storage (1208/1308/1408), or an external device(s). Alternatively, some or all of the executable instructions may be embedded in hardware or firmware on the respective device in addition to or instead of software.

Each device (110/120/130) includes input/output device interfaces (1202/1302/1402). A variety of components may be connected through the input/output device interfaces, as will be discussed further below. Additionally, each device (110/120/130) may include an address/data bus (1224/1324/1424) for conveying data among components of the respective device. Each component within a device (110/120/130) may also be directly connected to other components in addition to (or instead of) being connected to other components across the bus (1224/1324/1424).

Referring to the speech-controlled appliance 110 in FIG. 12, the input/output device interfaces 1202 connect to a variety of components such as a microphone or microphone array 112, a speaker or speaker(s) 116, an one or more antennas 1218 supporting wireless communication. Via the antenna(s), the input/output device interfaces 1202 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The appliance 110 includes a limited or extended speech recognition module 1230. The module may include the language models 254 stored in ASR model storage component 252, and an ASR module 250 that performs the automatic speech recognition process. If limited speech recognition is included, the speech recognition engine 258 may be configured to identify a limited number of words, such as wake words of the device, whereas extended speech recognition may be configured to recognize a much larger range of words.

The appliance may further include a command recognition module 1240. This module may be a partial implementation of the name entity recognition module 262 configured to recognize a limited number of commands, such as words a user can utter to wake the appliance from a standby mode.

A dispatch and coordination module 1262 interfaces with the appliance's operating system to execute commands such as wake words, routes utterances 11 and/or ASR output to the NLU processor 120, receives the NLU results, routes the NLU results to the appropriate application to execute the interpreted response (e.g., based on the domain), forward metadata such as an entity ID the to the NLU processor 120 and/or the CSA console, may manage a circular buffer 264 that stores user queries and received results, and may interface with the companion application 440 on the customer's terminal 12 (e.g., providing the dialog history as illustrated in FIG. 4, if not hosted on a remote server).

Referring to the NLU processor in FIG. 13, the input/output device interfaces 1302 connects the NLU processor 120 to the network(s) 199. The NLU processor 120 also includes the NLU module 260 comprising the name entity recognition module (262), the intent classification module (264), the results ranking and distribution module 266, and the stored knowledge base 272. The results ranking and distribution module 266 may include a web server that hosts the CSA console interface 510 (as a web page), and the interface provided by the customer companion application 440.

As illustrated in FIG. 13, an extended speech recognition component 1330 comprising the ASR module 250 and the ASR models 252 may exist somewhere on the network, and serve as an intermediary between the appliance 110 and the NLU processor 120. Among other arrangements, the extended speech recognition component 1330 may be part of the appliance, may be on a standalone device (e.g., another server), may be hosted by the server acting configured as the NLU processor 120, etc. Portions of the extended speech recognition component may be distributed across multiple network-connected devices.

Referring to the entity library 130 in FIG. 14, the input/output device interfaces 1402 connects the entity library 130 to the network(s) 199. A gazetteer lookup module 1432 may validate the identity of a connecting NLU processor 120 (for security), receives the Entity ID (e.g., Customer ID, Device ID, Household ID), identifies the gazetteers corresponding to the Entity ID(s), extracts requested data from the gazetteers, and forwards the information to the request device (e.g., the NLU processor 120). The entity library 130 also includes entity library storage 282 comprising the gazetteers 284.

The gazetteer information in the entity library 282 may be continually updated. A synchronization engine 1434 links with other databases (not shown) and/or the appliance 110. When the appliance or a customer or household member acquires new media (e.g., when a customer buys a new song, or a new song is loaded on the appliance) or services (loads a new service application), the synchronization engine determines the keywords and phrases relating to the purchase and adds them to one or more stored domain lexicons 286.

Components of the terminal 12 and CSA console 140 are not illustrated, but comprise computing devices supporting the interfaces described in connection with FIGS. 4 to 11. As noted above, the interfaces themselves may be delivered as web pages, such that the customer companion application 440 and console interface 510 may be implemented on the respective device as a web browser, although stand-alone software applications may also be used. Additionally, although the appliance 110 is illustrated as being speech based and without a display, a display may be added or connected, with the terminal 12 integrated into the appliance 12.

As noted above, multiple devices may be employed in a single speech processing system. In such a multi-device system, each of the devices may include different components for performing different aspects of the speech processing. The multiple devices may include overlapping components. The components of the devices 110, 120, and 130 as illustrated in FIGS. 12 to 14 are exemplary, and may be a stand-alone device or may be included, in whole or in part, as a component of a larger device or system.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, such as the acoustic front end 256, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A method for assisting a user with resolving a speech-based request, the method comprising:
   receiving, at a first device at a first time, a first utterance, wherein:
   the first device is associated with a customer identifier, and
   the first utterance includes a first command to contact a separate customer service device operated by a customer service agent;
   receiving, at the customer service device, the customer identifier associated with the first device;
   based at least in part on input by the customer service agent, sending, from the customer service device to a computer-implemented natural language processing system that is separate from the first device, a text query, the customer identifier, and a designation of at least one network-connected device including the customer service device;
   determining, by the natural language processing system, that the customer identifier is associated with a first domain;
   determining, by the natural language processing system and based at least in part on the customer identifier, that first user specific lexical information stored in at least one data storage device is associated with the first domain;
   determining, by the natural language processing system, that the text query corresponds to a first intent associated with the first domain and a first field associated with the first intent;
   determining, by the natural language processing system and based at least in part on the first user specific lexical information and a first model associated with the first domain, a first entity corresponding to the first field;
   sending a first interpretation of the text query from the natural language processing system to the customer service device, the first interpretation corresponding to the first intent and the first entity; and
   displaying the first interpretation on a screen of the customer service device.

2. The method of claim 1, wherein determining the first entity further comprises:
   calculating a plurality of probabilities, where each probability is a probability that a respective interpretation of the text query is correct, wherein the calculating uses respective similarities between words in the respective interpretation of the text query and the user specific lexical information.

3. The method of claim 1, further comprising:
   receiving, at the first device at a second time after the first time, a second utterance corresponding to a second command that was recommended by the customer service agent based on the first interpretation;

sending data corresponding to the second utterance to the natural language processing system;

determining, by the natural language processing system and based at least in part on the user specific lexical information, that the second utterance includes the second command; and causing the first device to perform at least one action corresponding to the second command.

4. A computer-implemented natural language processing system comprising:

at least one data storage device;

at least one processor; and a computer-readable medium encoded with instructions which, when executed by the at least one processor, cause the natural language processing system to:

receive a text query and an entity identifier from a first network-connected device; and in response to receiving the text query:

determine that the entity identifier is associated with a first domain, determine, based at least in part on the entity identifier, that first user specific lexical information stored in the at least one data storage device is associated with the first domain, determine that the text query corresponds to a first intent associated with the first domain and a first field associated with the first intent, determine, based at least in part on the first user specific lexical information and a first model associated with the first domain, a first entity corresponding to the first field, prepare a first result for the text query, the first result comprising data representing the first entity, prepare a second result for the text query, where the second result does not include the data representing the first entity, send a first message to the first network-connected device, the first message causing the first network connected device to output a first representation of the first result, and send a second message to a second network-connected device that is different than the first network-connected device, the second message causing the second network connected device to output a second representation of the second result.

5. The computer-implemented natural language processing system of claim 4, wherein the entity identifier identifies one or more of a customer account, a client device, or a household associated with the client device.

6. The computer-implemented natural language processing system of claim 4, wherein the computer-readable medium is encoded with additional instructions which, when executed by the at least one processor, further cause the system to:

determine that the entity identifier is associated with a second domain;

determine, based at least in part on the entity identifier, that second user specific lexical information stored in at least one data storage device is associated with the second domain;

determine that the text query corresponds to a second intent associated with the second domain and a second field associated with the second intent; and determine, based at least in part on the second user specific lexical information and a second model associated with the second domain, a second entity corresponding to the second field.

7. The computer-implemented natural language processing system of claim 6, wherein the computer-readable medium is encoded with additional instructions which, when executed by the at least one processor, further cause the system to:

cause the second result to include the second entity.

8. The computer-implemented natural language processing system of claim 4, wherein the computer-readable medium is encoded with additional instructions which, when executed by the at least one processor, further cause the system to:

receive a designation of a plurality of network-connected devices to be transmitted results, the plurality of network-connected devices including the first network-connected device and the second network-connected device; and cause the natural language processing system to send the first message to the first network-connected device and to send the second message to the second network-connected device based at least in part on the designation.

9. The computer-implemented natural language processing system of claim 4, wherein:

the first network-connected-device is associated with a customer service agent; and the second network-connected device is associated with the entity identifier.

10. The computer-implemented natural language processing system of claim 4, wherein the first result comprises at least one of:

a second entity corresponding to the first field; or a second intent corresponding to the text query.

11. A method performed by a computer-implemented natural language processing system, comprising:

receiving, from a first network-connected device, a text query and an entity identifier; and in response to receiving the text query:

determining that the entity identifier is associated with a first domain, determining, based at least in part on the entity identifier, that first user specific lexical information stored in at least one data storage device is associated with the first domain, determining that the text query corresponds to a first intent associated with the first domain and a first field associated with the first intent, determining, based at least in part on the first user specific lexical information and a first model associated with the first domain, a first entity corresponding to the first field, preparing a first result for the text query, the first result comprising data representing the first entity, preparing a second result for the text query, where the second result does not include the data representing the first entity, sending a first message to the first network-connected device, the first message causing the first network connected device to output a first representation of the first result, and sending a second message to a second network-connected device that is different than the first network-connected device, the second message causing the second network connected device to output a second representation of the second result.

12. The method of claim 11, wherein the entity identifier identifies one or more of a customer account, a client device, or a household associated with the client device.

13. The method of claim 11, further comprising:
determining that the entity identifier is associated with a second domain;
determining, based at least in part on the entity identifier, that second user specific lexical information stored in at least one data storage device is associated with the second domain;
determining that the text query corresponds to a second intent associated with the second domain and a second field associated with the second intent; and
determining, based at least in part on the second user specific lexical information and a second model associated with the second domain, a second entity corresponding to the second field.

14. The computer implemented method of claim 13, further comprising:
causing the second result to include data representing the second entity.

15. The method of claim 11, further comprising:
receiving a designation of a plurality of network-connected devices to be transmitted results, the plurality of network-connected devices including the first network-connected device and the second network-connected device;
wherein sending the first message to the first network-connected device and sending the second message to the second network-connected device are based at least in part on the designation.

16. The method of claim 11, wherein:
the first network-connected-device is associated with a customer service agent; and
the second network-connected device is associated with the entity identifier.

17. The method of claim 11, wherein the first result comprises at least one of:
a second entity corresponding to the first field; or
a second intent corresponding to the text query.

* * * * *